(12) United States Patent
Jayaraj et al.

(10) Patent No.: US 11,718,162 B2
(45) Date of Patent: Aug. 8, 2023

(54) TANDEM DRIVE DEVICE

(71) Applicant: WEBASTO SE, Stockdorf (DE)

(72) Inventors: Rajesh Jayaraj, Stockdorf (DE); Martin Traub, Stockdorf (DE); Jani Hovan, Stockdorf (DE); Bernhard Meier, Stockdorf (DE)

(73) Assignee: Webasto SE, Stockdorf (DE)

(*) Notice: Subject to any disclaimer, the term of this patent is extended or adjusted under 35 U.S.C. 154(b) by 415 days.

(21) Appl. No.: 16/969,814

(22) PCT Filed: Feb. 6, 2019

(86) PCT No.: PCT/EP2019/052833
§ 371 (c)(1),
(2) Date: Aug. 13, 2020

(87) PCT Pub. No.: WO2019/158407
PCT Pub. Date: Aug. 22, 2019

(65) Prior Publication Data
US 2020/0369133 A1 Nov. 26, 2020

(30) Foreign Application Priority Data
Feb. 15, 2018 (DE) .................... 10 2018 103 439.3

(51) Int. Cl.
B60J 7/057 (2006.01)
B60J 7/00 (2006.01)
(Continued)

(52) U.S. Cl.
CPC .......... *B60J 7/0573* (2013.01); *E05F 15/662* (2015.01); *B60J 7/0015* (2013.01); *E05F 15/643* (2015.01); *E05Y 2900/542* (2013.01)

(58) Field of Classification Search
CPC ...... B60J 7/0573; B60J 7/0015; B05F 15/662; B05F 15/643; B05F 15/60; B05F 15/655;
(Continued)

(56) References Cited

U.S. PATENT DOCUMENTS

2016/0288631 A1* 10/2016 Parkila ................... B60J 7/0573
2018/0009116 A1* 1/2018 Jeong ....................... B25J 18/04

FOREIGN PATENT DOCUMENTS

DE 19858630 A1 6/2000
DE 19849837 C2 2/2003
(Continued)

OTHER PUBLICATIONS

Boehmer et al., "Tandem Drive Device for Vehicle Movable Roof", Published: May 9, 2000, Japanese Patent Office, Edition: JP-2000127765-A (Year: 2000).*
(Continued)

Primary Examiner — Dennis H Pedder
Assistant Examiner — Joyce Eileen Hill
(74) Attorney, Agent, or Firm — Quarles & Brady LLP

(57) ABSTRACT

A tandem drive device for at least one adjustable vehicle part, in particular for a sliding roof system, preferably comprising at least two sliding roof elements such as, for example, a glass roof and a roller shutter, wherein the tandem drive device includes at least a first drive system having a first gear mechanism and a first drive motor, and a second drive system having a second gear mechanism and a second drive motor, as well as a common control circuit for the first drive motor and the second drive motor, wherein the first gear mechanism and the second gear mechanism as well as the control circuit are accommodated in a common housing.

14 Claims, 2 Drawing Sheets

(51) Int. Cl.
 *E05F 15/662* (2015.01)
 *E05F 15/643* (2015.01)

(58) Field of Classification Search
 CPC ......... E05Y 2088/205; E05Y 2900/542; F16H 57/02
 USPC ........................................ 296/223, 214, 219
 See application file for complete search history.

(56) References Cited

FOREIGN PATENT DOCUMENTS

| | | | | |
|---|---|---|---|---|
| DE | 10337851 | A1 | 3/2005 | |
| DE | 102016105587 | A1 | 10/2016 | |
| EP | 1314910 | A1 | 5/2003 | |
| JP | 2000127765 | A * | 5/2000 | ............ B60J 7/0573 |
| JP | 2005065493 | A * | 3/2005 | ............ B60N 2/0232 |
| JP | 2010057293 | A * | 3/2010 | ............ H02K 11/215 |
| WO | 0153640 | A1 | 7/2001 | |

OTHER PUBLICATIONS

Hideo et al., "Electric Motor", Published: Mar. 11, 2010, Japanese Patent Office, Edition: JP-2010057293-A (Year: 2010).*
Berger et al., "Transmission-Driving Unit Equipped With at Least Two Motors", Published: Mar. 10, 2005, European Patent Office, Edition: JP-2005065493-A (Year: 2005).*
PCT International Search Report and Written Opinion, PCT/EP2019/052833, dated May 27, 2019, 16 pages.
Japan Patent Office. Notice of Reasons for Refusal for application 2020-542983, dated Oct. 1, 2021. With translation. 9 pages.
Korea Intellectual Property Office. Notification for Reason for Refusal for application 10-2020-7023197, dated Oct. 26, 2021. With translation.

* cited by examiner

TANDEM DRIVE DEVICE

CROSS-REFERENCE TO RELATED APPLICATIONS

This application represents the National Stage of International Application No. PCT/EP2019/052833, filed Feb. 6, 2019, which claims priority to German Patent Application DE 10 2018 103 439.3, filed Feb. 15, 2018, which disclosures are hereby incorporated by reference for all purposes.

DESCRIPTION

The disclosure relates to a tandem drive device according to Claim 1 as well as to a system comprising an adjustable vehicle part and a tandem drive device, as well as to a vehicle.

A tandem drive device for an adjustable vehicle roof is known from DE 198 49 837 C2. The tandem drive device comprises two drive systems which are operatively connected in series, having two electric motors which by way of a dedicated gear mechanism are in each case drive-connected to an adjustable vehicle part by way of a force transmission means. The solution according to this prior art in terms of construction is considered to be comparatively complex.

It is therefore an object of the disclosure to propose a tandem drive device as well as a system comprising an adjustable vehicle part and a tandem drive device, as well as a vehicle, wherein in a manner which is simple in terms of construction the adjustment of one vehicle part or a plurality of (in particular two) vehicle parts, in particular a sliding roof element or sliding roof elements, such as, for example, a glass roof and a roller shutter, is to be enabled.

This object is achieved by the features of Claim 1.

The object is in particular achieved by a tandem drive device for at least one adjustable vehicle part, in particular at least two or exactly two, adjustable vehicle parts, in particular for a sliding roof system, preferably comprising at least two sliding roof elements such as, for example, a glass roof and a roller shutter, wherein the tandem drive device comprises at least a first drive system having a first gear mechanism and a first drive motor, and a second drive system having a second gear mechanism and a second drive motor, as well as a common control circuit for the first drive motor and the second drive motor, wherein the first gear mechanism and the second gear mechanism as well as the control circuit are accommodated in a common housing.

A core concept of the disclosure lies in accommodating the first gear mechanism and the second gear mechanism as well as the control circuit in a common housing. On account thereof, the two drive systems can be used, in particular supplied with power, or controlled, respectively, in a manner which is simple in terms of construction. On account thereof, no connection (for example a wire harness) is required between the two drive systems (in particular for the supply of signals and power, in particular electric power). A complex cable harness having two power supply lines and a plurality of signal lines can thus be dispensed with. The number of plug connectors can also be reduced. For example, it is no longer necessary for a connection (cable harness) having two plug connectors (for connecting to an electronics board of a motor) to be provided. Corresponding fastening elements for connections (cable harness) to a frame are also dispensed with. Overall, costs are lowered and the installation space is reduced.

In contrast to publication DE 198 49 837 C2 in which a central concept of the solution thereof lies in providing a separate control circuit housing between the two drive systems (or the other components of the drive system, respectively), in the case of the solution according to the disclosure a common housing is configured in which not only a (common) control circuit but also the plurality of (two) gear mechanisms are disposed. On account thereof, the overall structure can be simplified and simple driving can take place by way of the two drive systems.

The first drive motor and/or the second drive motor are/is preferably an electric motor/electric motors. The control circuit preferably comprises at least one processor (microprocessor) for actuating the first drive system and/or the second drive system.

A common housing is in particular to be understood such that a common (in particular tight, optionally with the exception of openings for connections, force-transmitting means and the like) casing is provided, the gear mechanisms and the (common) control circuit being accommodated in the latter. The (common) housing preferably has a volume of less than 10,000 cm$^3$, furthermore preferably less than 2000 cm$^3$, even more preferably less than 1000 cm$^3$, yet more preferably less than 500 cm$^3$. The housing (at least substantially) can be configured as a cuboid and/or comprise a plurality of (for example six) walls which per se are in each case optionally (at least substantially) planar.

An Y-axis hereunder is to be understood to be an axis which is defined by a rotation axis of the first drive motor, a X-axis is understood to be an axis which is perpendicular to the Y-axis and perpendicular to a Z-axis, and the Z-axis is understood to be an axis which is defined by an output rotation axis of the first gear mechanism.

The output rotation axis of the first gear mechanism is preferably perpendicular to a rotation axis of the first motor. Alternatively or additionally, an output rotation axis of the second gear mechanism is perpendicular to a rotation axis of the second motor. Rotation axes of the two drive motors are preferably mutually parallel. Alternatively or additionally, the output rotation axes of the two gear mechanisms are mutually parallel.

An extent of the housing in the direction of the X-axis (=X-direction) is preferably less than or equal to 400 mm, furthermore preferably less than or equal to 200 mm, even furthermore preferably less than or equal to 150 mm, and in embodiments even less than or equal to 100 mm. The extent in a direction of the Y-axis (=Y-direction) is preferably less than or equal to 600 mm, furthermore preferably less than or equal to 300 mm, even furthermore preferably less than or equal to 200 mm, and in embodiments even less than or equal to 120 mm. An extent in the direction of the housing in the direction of the Z-axis (=Z-direction) is preferably less than or equal to 100 mm, furthermore preferably less than or equal to 50 mm, even furthermore preferably less than or equal to 40 mm.

In embodiments, a ratio of the extent of the housing in the X-direction to the extent of the housing in the Y-direction can be in a range from 1:5 to 4:5, preferably 1:3 to 2:3. In other embodiments, a ratio of the extent of the housing in the Y-direction to the extent of the housing in the X-direction can in turn be in a range from 2:1 to 1:3, preferably from 6:5 to 5:7. The extent of the housing in the Z-direction is preferably less than in the X-direction and/or the Y-direction. For example, the extent of the housing in the Z-direction is at most half the extent in the X-direction and/or the Y-direction.

Fastening of the common housing (or of the gear mechanisms located therein and of the control circuit located therein, respectively) can be implemented by way of fewer than six, in particular fewer than four, optionally just three, fastening points. A position of the fastening points can be chosen with a view to optimizing noise and with a view to a centre of gravity.

The first gear mechanism and/or the second gear mechanism can (in each case per se) comprise a worm shaft and/or a worm gear and/or a driveshaft. The driveshaft can be brought to engage with a force transmission means, for example in the form of a cable train which optionally has drive cables which are guided so as to be stiff under tension and compression.

The first gear mechanism and the second gear mechanism (or the first drive motor and the second drive motor, respectively) are preferably assigned to different vehicle parts (in particular in each case one adjustable vehicle part). The first gear mechanism (or the first motor, respectively) is furthermore preferably assigned to a first sliding roof element, and the second gear mechanism, or the second motor, respectively, is assigned to a second sliding roof element (in particular a roller shutter). The first sliding roof element is preferably a glass roof.

In one specific embodiment the adjustable vehicle parts can be a panoramic roof of a vehicle, in particular of a motor vehicle (preferably a passenger or commercial motor vehicle).

The two drive systems can be (operatively) connected in series. The first gear mechanism and/or the second gear mechanism can in each case be drive-connected to the adjustable vehicle part by way of in each case at least one force transmission means (drive cable or cable train, respectively). An introduction of force from the drive systems (or the gear mechanisms, respectively) into the respective force transmission means can take place at locations which are offset in the direction of movement of said force transmission means.

In one embodiment, the gear mechanisms can be disposed on ends of the corresponding drive motors (electric motors) that face one another. Alternatively, said gear mechanisms can be disposed on ends of the electric motors that face away from one another.

The (common) control circuit is preferably integrated in a (common) controller board. The (common) controller board is preferably at least substantially rectangular. A favourable shape of the electronics board of this type is enabled by the common gear mechanism housing as well as the common control circuit (and optionally the common electronics system cover).

In one preferred embodiment, a (common) electronics system cover which covers the (common) control circuit or controller board, respectively, is provided. An electronics system cover is in particular to be understood as a cover for the electronics system (control circuit or controller board, respectively). The control circuit or the controller board, respectively, in this instance is accessible by removing the (optionally releasable) electronics system cover. A planar extent of the electronics system cover to this extent preferably corresponds substantially to the planar extent of the control circuit or the controller board, respectively (the planar extent of the electronics system cover can optionally be up to 10% or up to 20% or up to 50% larger or smaller than the planar extent of the control circuit or the controller board, respectively).

The first drive motor and/or the second drive motor are/is preferably at least in part (optionally completely) disposed outside the common housing. Repairing or assembling drive motors can be facilitated on account thereof; by virtue of the common housing, the tandem drive device can nevertheless be actuated and supplied in a simple manner (without having to rely on a multiplicity of lines).

The common housing, at least in one lateral view (optionally in at least two different, preferably at least four different, furthermore preferably six different, lateral views) can be configured so as to be (at least substantially) polygonal, in particular quadrangular, preferably rectangular.

(Only) one apparatus plug connector, in particular only one vehicle-interface apparatus plug connector, is preferably provided. A vehicle-interface apparatus plug connector is preferably understood to be an apparatus plug connector in which a supply of power and/or transmission of signals from the vehicle to the tandem drive device can take place (or also vice versa, at least in the case of the transmission of signals, respectively). Complex connecting means can be avoided on account thereof.

The first gear mechanism and the second gear mechanism are preferably mutually disposed so as to be symmetrical. The (entire) first drive system and the (entire) second drive system can also be mutually disposed so as to be axially symmetrical. A balanced distribution of weight is achieved by an arrangement of this type, in particular by a symmetrical position of drive elements. An axial symmetry is understood to be an axial symmetry in the three-dimensional space (thus in a manner analogous to a point reflection in the two-dimensional space), thus in particular a 180° rotational symmetry in the three-dimensional space. The symmetry axis is preferably an axis which, preferably so as to be centric in the housing, is parallel to the output rotation axis of the first gear mechanism and/or the second gear mechanism.

In one specific embodiment, the first gear mechanism and the second gear mechanism overlap at least in portions in an axial (viewing) direction which is defined by a rotation axis of the first drive motor. In other words, projections of the first gear mechanism and of the second gear mechanisms at least in portions (optionally completely) overlap on a plane which is perpendicular to the axial direction. When viewed from the first drive motor and/or the second drive motor, the first gear mechanism and the second gear mechanism in portions can be disposed behind one another. On account thereof, a particularly compact construction mode in the direction perpendicular to the rotation axis of the first drive motor (and/or the second drive motor) is achieved.

In one alternative embodiment, the first gear mechanism and the second gear mechanism do not overlap in an axial direction which is defined by a rotation axis of the first drive motor. On account thereof, a particularly compact construction mode in a direction perpendicular to the rotation axis is achieved.

A rotating direction (rotation) of the first drive motor is preferably counter to a rotating direction (rotation) of the second drive motor. On account thereof, an impediment or an unintentional effect, respectively, on the housing, in particular an unintentional torsional distortion of the housing, is reduced or avoided.

The housing is preferably integral, optionally monolithic (but may also be constructed from a plurality of parts). A comparatively high stiffness (and less or no rattling noise) is achieved on account thereof. The housing (by virtue of the resonance frequency and the mass) can generally be improved in terms of noise.

According to one further independent aspect of the disclosure, the use of the tandem drive device of the type above is proposed for at least one adjustable vehicle part, in particular for a sliding roof system, preferably comprising at least two sliding roof elements such as, for example, a glass roof and a roller shutter.

A glass roof is in particular to be understood to be a transparent roof (roof element) which is preferably (but not necessarily) composed of glass. Alternatively, the glass roof in this context may also be constructed from plastics material. A roller shutter is in particular to be understood to be a sliding roof element (which can be rolled up), said sliding roof element in particular allowing no (or only little) light to pass through.

The above-mentioned object is furthermore achieved by a system comprising an adjustable vehicle part, in particular a sliding roof system, preferably comprising at least two sliding roof elements such as, for example, a glass roof and a roller shutter, as well as a tandem drive device of the type above.

The object is furthermore achieved by a vehicle, in particular a motor vehicle, preferably a passenger or commercial motor vehicle, comprising the system above.

Further embodiments are derived from the dependent claims.

The disclosure will be described hereunder by means of exemplary embodiments which are described in more detail by means of the illustration:

The same reference signs are used for identical and functionally equivalent parts in the description hereunder.

Figure 1:
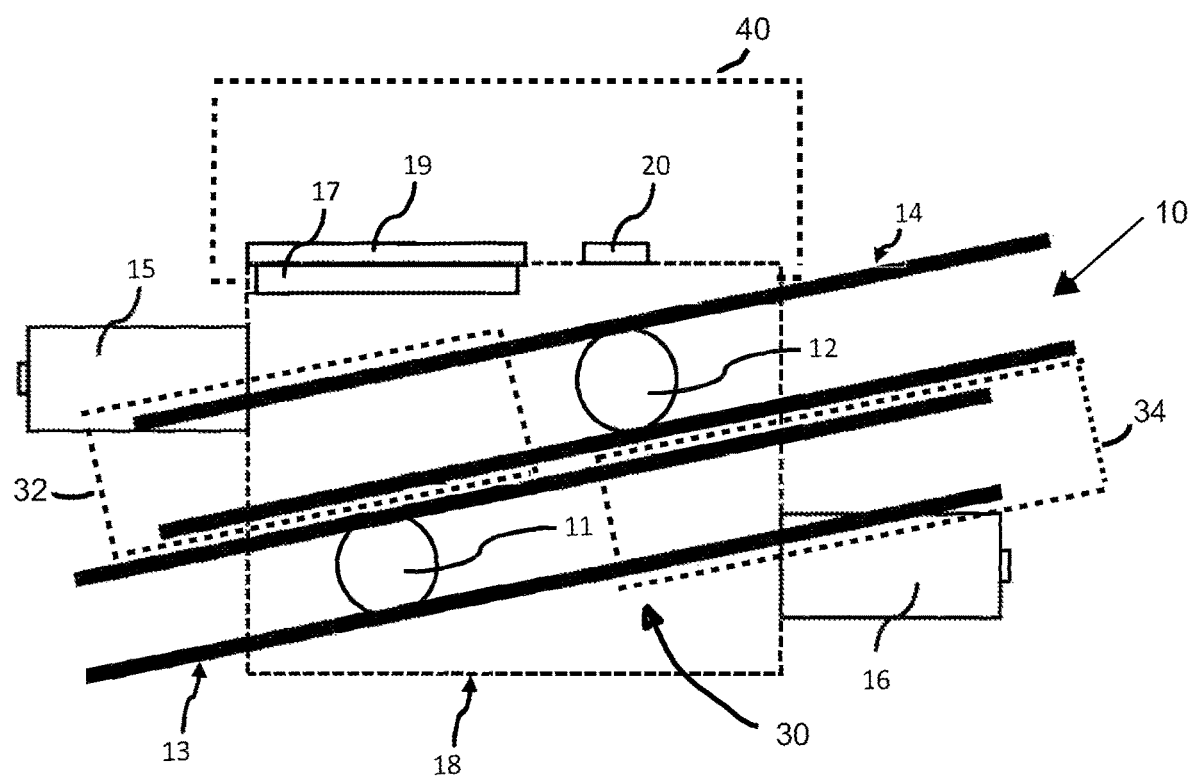
FIG. 1 shows a schematic lateral view of a tandem drive device according to the disclosure.

FIG. 1 in a schematic view shows a tandem drive device 10 including a first gear mechanism 11 as well as a second gear mechanism 12. The first gear mechanism 11 by way of a first force transmission means 13 (first cable train) is operatively connected to a first adjustable vehicle part, in particular a first sliding roof element 32 of a sliding roof system 30, which can be a glass. The second gear mechanism 12 by way of a second force transmission means (cable train) is operatively connected to a second adjustable vehicle part, fin particular a second sliding roof element 34 of a sliding roof system, which can be a roller shutter. Accordingly, the respective adjustable vehicle parts can be adjusted by way of the gear mechanisms 11, 12. The first gear mechanism 11 is driven by a first drive motor 15. The second gear mechanism 12 is driven by a second drive motor 16. The sliding roof system 30 can be the roof system of a motor vehicle 40, such as a passenger or commercial motor vehicle.

The first gear mechanism 11, the second gear mechanism 12, as well as a (schematically shown) control circuit 17 (controller board) are disposed in a common housing 18. The drive motors (electric motors) 15, 16 are disposed outside this housing 18. Furthermore provided is also an electronics system cover 19 (likewise indicated in only a schematic manner) by way of which the control circuit 17 (controller board) is covered (or can be covered, respectively). A supply of power (in particular electric power) as well as a supply of signals to the tandem drive device 10 can take place by way of a (common) apparatus plug connector 20.

Figure 2:
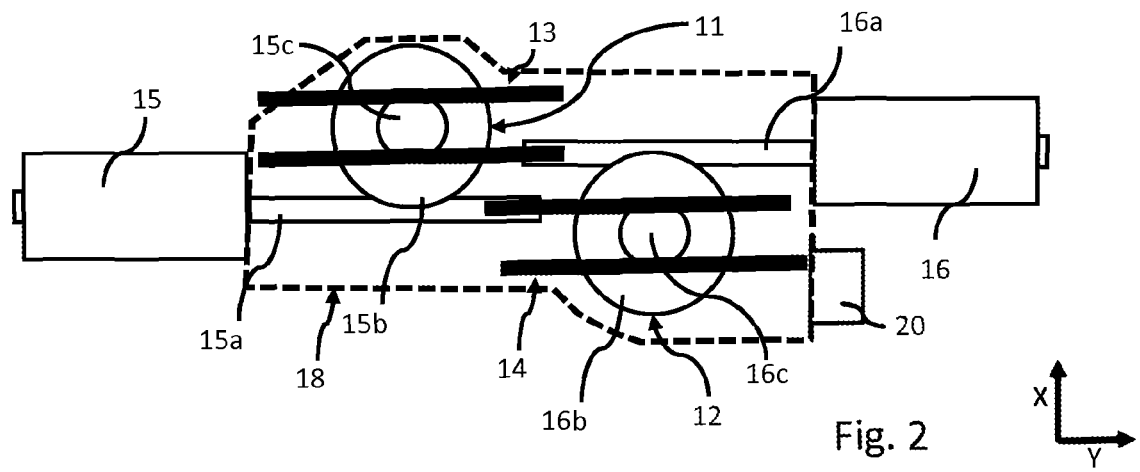
FIG. 2 shows a schematic lateral view of a further tandem drive device according to the disclosure.
Figure 3:
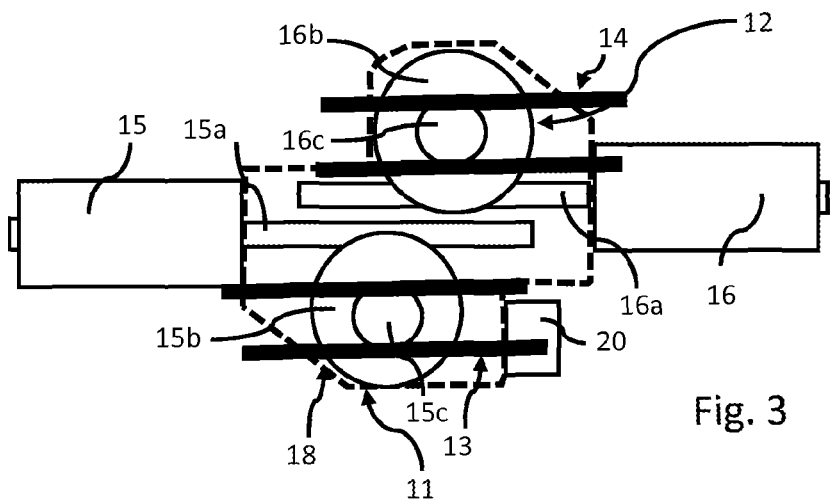
FIG. 3 shows a schematic lateral view of a further tandem drive device according to the disclosure.

FIGS. 2 and 3 show further embodiment of the tandem drive device 10 according to the disclosure, having in particular further details in terms of the gear mechanisms 12, 13. It is illustrated here in that (in FIG. 2 as well as FIG. 3) the first drive motor 15 by way of a (worm) shaft 15a drives a (worm) gear 15b. In turn, an (output) sprocket 15c is (optionally indirectly) driven by way of the gear 4, the force transmission means 13 in turn then being driven by way of said (output) sprocket 15c. Further details of the gear mechanism can be configured, for example, as described in DE 197 34 815 C1 (cf. in the latter in particular reference signs 2, 3, 4, 4A, 6, 7, 8, 9, 10, 10A-10E). The second drive motor 16, and the second gear mechanism 12, respectively, (in FIG. 2 as well as in FIG. 3) are assigned analogous gear mechanism elements 16a, 16b, and 16c.

The embodiments of FIGS. 2 and 3 differ in particular in terms of the disposal of the gear mechanisms 11, 12 and (associated therewith) the structure of the respective housing 18.

An embodiment having a comparatively small extent in the X-direction is shown in FIG. 2. In this embodiment, the gear mechanisms 11, 12 overlap when viewed in the X-direction. In contrast, the embodiment according to FIG. 3 has an enlarged extent in the X-direction but an extent of extremely small dimensions in the Y-direction. The extent in the Z-direction can be identical in the embodiments according to FIGS. 2 and 3.

It can specifically apply to the embodiment according to FIG. 2: extent in the Y-direction=90-110 mm; extent in the Y-direction=160-190 mm; extent in the Z-direction=28-38 mm. It can apply to the embodiments according to FIG. 3: extent in the X-direction=110-130 mm; extent in the Y-direction=110-130 mm; extent in the Z-direction=28-38 mm.

The gear mechanisms 11, 12 of the embodiment according to FIG. 3 do not overlap in the Y-direction.

It is to be pointed out at this juncture that all parts described above, considered by themselves and in any combination, in particular the details illustrated in the drawings, are part of the description. Modifications thereof are familiar to the person skilled in the art.

REFERENCE SIGNS

11 First gear mechanism
12 Second gear mechanism
13 First force transmission means (cable train)
14 Second force transmission means (cable train)
15 First drive motor (electric motor)
16 Second drive motor (electric motor)
17 Control circuit (controller board)
18 (Common) housing
19 Electronics system cover
20 Apparatus plug connector

The invention claimed is:

1. A tandem drive device for a sliding roof system, comprising at least two sliding roof elements, comprising:
   at least a first drive system having a first gear mechanism and a first drive motor, and
   a second drive system having a second gear mechanism and a second drive motor,
   a common control circuit for the first drive motor and the second drive motor, wherein the first gear mechanism and the second gear mechanism, and the control circuit are accommodated in a common housing,
   wherein the first drive motor and/or the second drive motor are/is at least in part disposed outside the common housing,
   wherein:
   the first gear mechanism and the second gear mechanism overlap at least in portions in an axial direction defined by a rotation axis of the first drive motor, or the first gear mechanism and the second gear mechanism overlap at least in portions in an axial direction perpendicular to the rotation axis of the first drive motor;

wherein the first drive system including the first gear mechanism and the first drive motor on the one hand, and the second drive system including the second gear mechanism and the second drive motor on the other hand are mutually disposed so as to be rotationally symmetrical, the corresponding rotational axis of symmetry being an axis which, so as to be centric in the housing, is parallel to an output rotation axis of the first pear mechanism and/or the second gear mechanism.

2. The tandem drive device according to claim 1,
wherein the common control circuit is integrated in a controller board.

3. The tandem drive device according to claim 1,
further comprising a common electronics system cover.

4. The tandem drive device according to claim 1,
wherein the common housing, at least when viewed in a lateral view, is configured so as to be at least substantially quadrangular.

5. The tandem drive device according to claim 1,
comprising only one vehicle-interface apparatus plug connector.

6. The tandem drive device according claim 1,
wherein at least the first gear mechanism and the second gear mechanism are mutually disposed so as to be axially symmetrical.

7. The tandem drive device according to claim 1,
wherein the first gear mechanism and the second gear mechanism do not overlap in an axial direction defined by a rotation axis of the first drive motor.

8. The tandem drive device according to claim 1,
wherein a rotating direction of the first drive motor is counter to a rotating direction of the second drive motor.

9. A sliding roof system comprising a sliding roof system and a tandem drive device according to claim 1.

10. The sliding roof system according to claim 9 further comprising a motor vehicle.

11. The tandem drive device according to claim 1, wherein the common control is integrated in a substantially rectangular controller board.

12. The tandem drive device according to claim 1, wherein the common housing, at least when viewed in a lateral view, is configured so as to be at least substantially rectangular.

13. The tandem drive device according claim 1 wherein the first drive system and the second drive system are mutually disposed so as to be axially symmetrical.

14. The sliding roof system of claim 9, wherein the at least two sliding roof elements comprise a glass roof and a roller shutter.

* * * * *

UNITED STATES PATENT AND TRADEMARK OFFICE
CERTIFICATE OF CORRECTION

| | | |
|---|---|---|
| PATENT NO. | : 11,718,162 B2 | Page 1 of 1 |
| APPLICATION NO. | : 16/969814 | |
| DATED | : August 8, 2023 | |
| INVENTOR(S) | : Rajesh Jayaraj et al. | |

It is certified that error appears in the above-identified patent and that said Letters Patent is hereby corrected as shown below:

In the Specification

Column 5, Line 44, "fin" should be --in--.

In the Claims

Claim 1, Column 7, Line 12, "pear" should be --gear--.

Signed and Sealed this
Tenth Day of October, 2023

Katherine Kelly Vidal
*Director of the United States Patent and Trademark Office*